(12) United States Patent
Chen et al.

(10) Patent No.: US 10,121,051 B2
(45) Date of Patent: Nov. 6, 2018

(54) OPTICAL APPARATUS AND A METHOD FOR IDENTIFYING AN OBJECT

(71) Applicant: Novatek Microelectronics Corp., Hsinchu (TW)

(72) Inventors: I-Hsiu Chen, Taipei (TW); Li-Yuan Chang, Yunlin County (TW)

(73) Assignee: Novatek Microelectronics Corp., Hsinchu (TW)

( * ) Notice: Subject to any disclaimer, the term of this patent is extended or adjusted under 35 U.S.C. 154(b) by 111 days.

(21) Appl. No.: 15/067,198

(22) Filed: Mar. 11, 2016

(65) Prior Publication Data

US 2017/0109560 A1    Apr. 20, 2017

Related U.S. Application Data

(60) Provisional application No. 62/242,319, filed on Oct. 16, 2015.

(51) Int. Cl.
  *G06K 9/00* (2006.01)
  *G06K 9/03* (2006.01)
(52) U.S. Cl.
  CPC ......... *G06K 9/00033* (2013.01); *G06K 9/001* (2013.01); *G06K 9/00046* (2013.01); *G06K 9/036* (2013.01); *G06K 2009/0006* (2013.01)
(58) Field of Classification Search
  CPC ............... G06K 9/00033; G06K 9/001; G02F 1/133603; H04N 9/07
  USPC ....................................... 382/124
  See application file for complete search history.

(56) References Cited

U.S. PATENT DOCUMENTS

| | | | |
|---|---|---|---|
| 7,920,728 B2* | 4/2011 | Chen | G06K 9/00046 382/115 |
| 8,110,885 B2 | 2/2012 | Iida et al. | |
| 8,736,587 B2 | 5/2014 | Yamazaki | |
| 8,854,251 B2* | 10/2014 | Tokoro | G01S 13/34 342/104 |
| 9,245,164 B2 | 1/2016 | Pan et al. | |
| 9,298,317 B2 | 3/2016 | Chou | |
| 9,501,686 B2* | 11/2016 | Lin | G06K 9/0004 |
| 2006/0061674 A1 | 3/2006 | Iida et al. | |
| 2007/0269084 A1* | 11/2007 | Chen | G06K 9/00046 382/124 |

(Continued)

FOREIGN PATENT DOCUMENTS

| | | |
|---|---|---|
| CN | 101632089 | 1/2010 |
| CN | 102339382 | 2/2012 |

(Continued)

OTHER PUBLICATIONS

"Office Action of Taiwan Counterpart Application", dated Feb. 18, 2017, p. 1-p. 10.

*Primary Examiner* — Iman K Kholdebarin
(74) *Attorney, Agent, or Firm* — JCIPRNET

(57) ABSTRACT

An optical apparatus adapted to contact an object is provided. The optical apparatus includes an optical device and a processing circuit. The optical device includes a reflection structure and a transmission structure. The optical device senses light signals of the object via the reflection structure and the transmission structure. The processing circuit is electrically connected to the optical device. The processing circuit is configured to identify the object according to the light signals. In addition, a method for identifying an object is also provided.

18 Claims, 9 Drawing Sheets

(56) References Cited

U.S. PATENT DOCUMENTS

| | | | |
|---|---|---|---|
| 2009/0027357 A1* | 1/2009 | Morrison | G06F 3/0421 345/175 |
| 2014/0086459 A1 | 3/2014 | Pan et al. | |
| 2014/0168167 A1 | 6/2014 | Chou | |
| 2016/0104028 A1 | 4/2016 | Pan et al. | |
| 2017/0109560 A1* | 4/2017 | Chen | G06K 9/00033 |

FOREIGN PATENT DOCUMENTS

| | | |
|---|---|---|
| CN | 104346604 | 2/2015 |
| TW | 201101196 | 1/2011 |
| TW | 201413596 | 4/2014 |
| TW | 201426563 | 7/2014 |

\* cited by examiner

OPTICAL APPARATUS AND A METHOD FOR IDENTIFYING AN OBJECT

CROSS-REFERENCE TO RELATED APPLICATION

This application claims the priority benefits of U.S. provisional application Ser. No. 62/242,319, filed on Oct. 16, 2015. The entirety of the above-mentioned patent application is hereby incorporated by reference herein and made a part of this specification.

BACKGROUND OF THE INVENTION

1. Field of the Invention

The invention generally relates to an optical apparatus and a method for identifying an object, in particular, to an optical apparatus for fingerprint application and a method for identifying a fingerprint.

2. Description of Related Art

Optical devices such as optical fingerprint collection devices are widely used for fingerprint collection and identification. The collection of fingerprints through optical devices is based on optical imaging the finger surface through optical sensors. Most conventional optical devices for fingerprint collection, such as a reflection type fingerprint reader, use a prism which is directly contacted by a finger of the user, and a light source and an image capture unit is installed at different side of the prism. Through total internal reflection and frustrated total internal reflection (FTIR), the ridge-valley patterns of a fingerprint may produce a high contrast fingerprint image. On the other hand, some optical devices for fingerprint collection use a transmission type fingerprint reader to collect the fingerprint. Light signals transmit into the finger and then scatter back to the image capture unit. In certain related arts, the light signals may go through the whole finger.

For information security, how to manufacture an optical device for fingerprint collection that has anti-spoofing capability and satisfactory identification quality is one of the most important topics in the pertinent field.

SUMMARY OF THE INVENTION

Accordingly, the invention is directed to an optical apparatus and a method for identifying an object for fingerprint application.

An exemplary embodiment of the invention provides an optical apparatus adapted to contact an object. The optical apparatus includes an optical device and a processing circuit. The optical device includes a reflection structure and a transmission structure. The optical device senses light signals of the object via the reflection structure and the transmission structure. The processing circuit is electrically connected to the optical device, and configured to identify the object according to the light signals.

In an exemplary embodiment of the invention, the light signals include a first light signal and a second light signal. The first light signal transmits in the reflection structure and is reflected by the object. The second light signal transmits in the transmission structure and propagates inside the object.

In an exemplary embodiment of the invention, the optical device further includes an isolation structure. The isolation structure is configured to isolate the first light signal from the second light signal.

In an exemplary embodiment of the invention, a wavelength of the first light signal is different from a wavelength of the second light signal.

In an exemplary embodiment of the invention, the optical device senses the first light signal and the second light signal during different exposure periods.

In an exemplary embodiment of the invention, the second light signal includes a biometric identification information. The processing circuit identifies the object according to the biometric identification information.

In an exemplary embodiment of the invention, a first image and a second image are respectively generated according to the first light signal and the second light signal.

In an exemplary embodiment of the invention, the optical device further senses an environment light signal. A third image is generated according to the environment light signal. The processing circuit reduces an environment light of the first image and the second image according to the third image.

In an exemplary embodiment of the invention, the processing circuit respectively compares the first image and the second image to at least one reference image to identify the object.

In an exemplary embodiment of the invention, the processing circuit determines whether the first image and the second image have opposite tones according to image brightness.

An exemplary embodiment of the invention provides a method for identifying an object, adapted to an optical apparatus. The method for identifying the object includes: sensing light signals of the object via a reflection structure and a transmission structure; and identifying the object according to the light signals. The optical apparatus includes the reflection structure and the transmission structure.

In an exemplary embodiment of the invention, the light signals include a first light signal and a second light signal. The step of sensing light signals of the object via the reflection structure and the transmission structure includes: sensing the first light signal of the object via the reflection structure, and sensing the second light signal of the object via the transmission structure. The first light signal transmits in the reflection structure and is reflected by the object, and the second light signal transmits in the transmission structure and propagates inside the object.

In an exemplary embodiment of the invention, in the step of sensing light signals of the object via the reflection structure and the transmission structure, the first light signal and the second light signal are sensed during different exposure periods.

In an exemplary embodiment of the invention, the second light signal includes a biometric identification information. The step of identifying the object according to the light signals includes: identifying the object according to the biometric identification information.

In an exemplary embodiment of the invention, the method for identifying the object further includes: respectively generating a first image and a second image according to the first light signal and the second light signal.

In an exemplary embodiment of the invention, the method for identifying the object further includes: sensing an environment light signal, and generating a third image according to the environment light signal; reducing an environment light of the first image and the second image according to the third image.

In an exemplary embodiment of the invention, the method for identifying the object further includes: respectively comparing the first image and the second image to at least one reference image to identify the object.

In an exemplary embodiment of the invention, the method for identifying the object further includes: determining whether the first image and the second image have opposite tones according to image brightness.

In an exemplary embodiment of the invention, the optical apparatus further includes an isolation structure. The isolation structure is configured to isolate the first light signal from the second light signal.

In an exemplary embodiment of the invention, a wavelength of the first light signal is different from a wavelength of the second light signal.

According to the above descriptions, in the exemplary embodiments of the invention, the processing circuit identifies the object according to the light signals sensed by the optical device via the reflection structure and the transmission structure thereof, so as to enhance the anti-spoofing capability.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
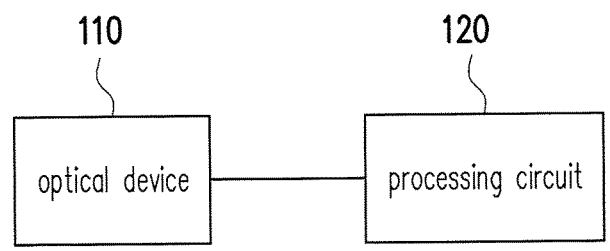
FIG. 1 illustrates a block diagram of an optical apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments are provided below to describe the disclosure in detail, though the disclosure is not limited to the provided embodiments, and the provided embodiments can be suitably combined. The term "coupling/coupled" and the phrase "electrically connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

FIG. 1 illustrates a block diagram of an optical apparatus according to an embodiment of the invention. Referring to FIG. 1, the optical apparatus 100 of the present embodiment includes an optical device 110 and a processing circuit 120. In the present embodiment, the optical device 110 is adapted to contact an object such as a finger, and senses light signals (not shown in FIG. 1) from the finger to generate a fingerprint image. One of the light signals may include a biometric identification information, and the biometric identification information is, for example, a heartbeat of the user. In the present embodiment, the processing circuit 120 is electrically connected to the optical device 110, and identify the fingerprint according to the light signals. The processing circuit 120 may control the optical device 110 to sense the light signals during different exposure periods, and also sense an environment light signal for environment light reduction.

In the present embodiment, the processing circuit 120 includes, for example, Central Processing Unit (CPU), Microprocessor, Digital Signal Processor (DSP), Programmable Controller, Programmable Logic Device (PLD), or other similar devices, a combination of the said devices, which are not particularly limited in the invention.

Figure 2:
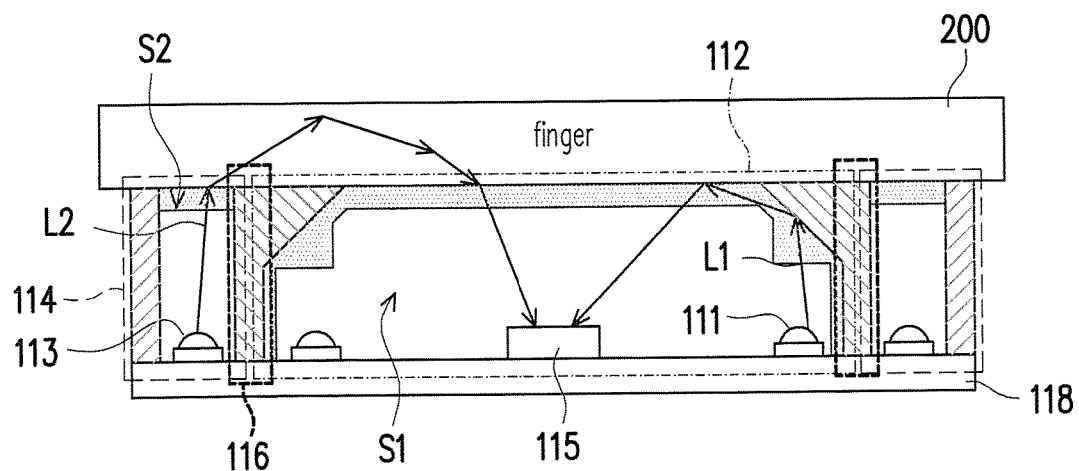
FIG. 2 illustrates a side view of the optical device depicted in FIG. 1 according to an embodiment of the invention.

FIG. 2 illustrates a side view of the optical device depicted in FIG. 1 according to an embodiment of the invention. Referring to FIG. 1 and FIG. 2, the optical device 110 of FIG. 1 may be implemented as the structure disclosed in FIG. 2, but the invention is not limited thereto. The optical device 110 of the present embodiment includes a reflection structure 112, a transmission structure 114, and an isolation structure 116. In the present embodiment, the optical device 110 respectively senses a first light signal L1 and a second light signal L2 of the finger 200 via the reflection structure 112 and the transmission structure 114.

To be specific, in the present embodiment, a plurality of light sources 111 and at least one sensor 115 are disposed on a substrate 118, and inside a sensing space S1 of the optical device 110. The light sources 111 includes light emitting diodes and outputs the first light signal L1 to the reflection structure 112. The first light signal L1 is reflected by the reflection structure 112 and the finger 200, respectively, and transmits to the sensor 115. In the present embodiment, the reflection structure 112 is disposed on a reflection path of the first light signal L1. Accordingly, the optical device 110 senses the first light signal L1 of the finger 200 via the reflection structure 112, and generates a first image of the fingerprint according to the first light signal L1.

In the present embodiment, a plurality of light sources 113 are also disposed on the substrate 118, and inside a containing space S2 of the transmission structure 114. The light sources 113 includes light emitting diodes and outputs the second light signal L2. The second light signal L2 transmits in the transmission structure 114 and propagates inside the finger 200 as illustrated in FIG. 2. Accordingly, the second light signal L2 includes a biometric identification information of the user, and the biometric identification information is, for example, a heartbeat. Next, the second light signal L2 leaves the finger 200 and transmits to the sensor 115. The processing circuit 120 identifies the fingerprint according to the biometric identification information to avoid erroneously sensing a fake fingerprint. Accordingly, the optical device 110 senses the second light signal L2 of the finger 200 via the transmission structure 114, and generates a second image of the fingerprint according to the second light signal L2.

In the present embodiment, a wavelength of the first light signal L1 may be the same as or different from a wavelength of the second light signal L2. For the same case, the light sources 111 and 113 may output blue light beams to serve as the first light signal L1 and the second light signal L2, and the isolation structure 116 is disposed between the light sources 111 and 113 to separate the first light signal L1 from the second light signal L2. For the difference case, the light sources 111 and 113 may output blue light beams and infrared beams to serve as the first light signal L1 and the second light signal L2, respectively. The wavelength of the first light signal L1 is different from the wavelength of the second light signal L2.

It should be noticed that the wavelengths of the first light signal L1 and the second light signal L2 are exemplarily disclosed for the present embodiment, and the invention is not limited thereto. Furthermore, in the present embodiment, the sensor 115 includes, for example, a charge coupled device image sensor (CCD image sensor) or a complementary metal oxide semiconductor (CMOS) image sensor or the like, which are not particularly limited by the invention.

Figure 3:
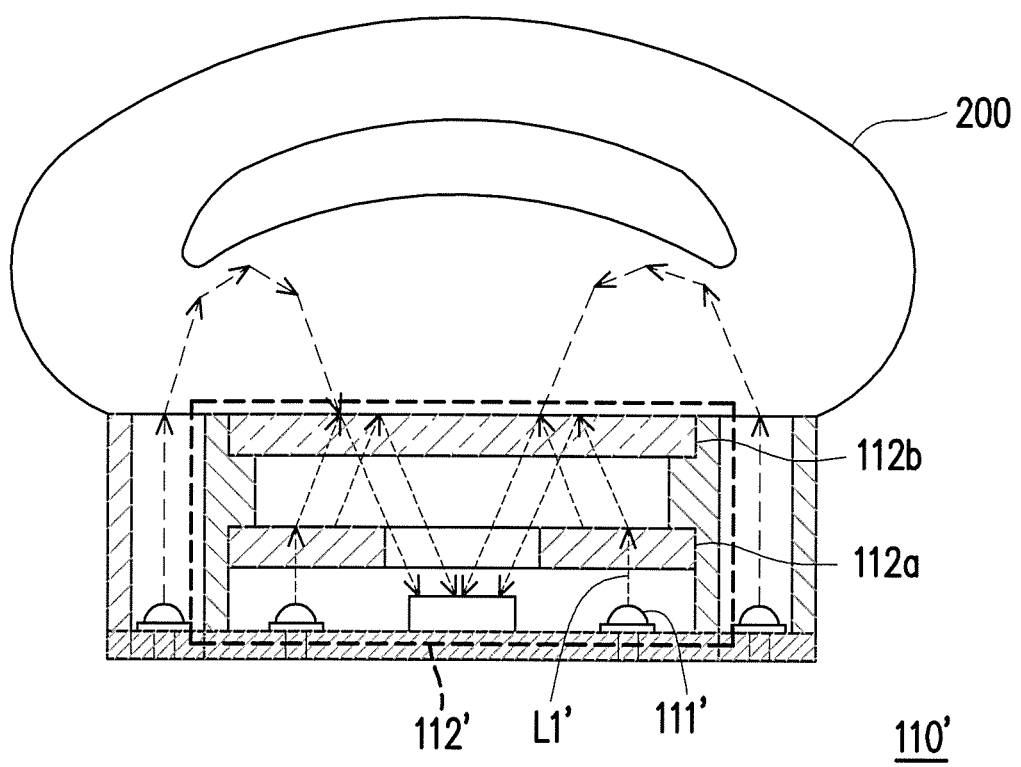
FIG. 3 illustrates a side view of the optical device depicted in FIG. 1 according to another embodiment of the invention.

FIG. 3 illustrates a side view of the optical device depicted in FIG. 1 according to another embodiment of the invention. Referring to FIG. 1 and FIG. 3, the optical device 110 of FIG. 1 may be also implemented as the structure disclosed in FIG. 3, but the invention is not limited thereto. The structure disclosed in FIG. 3 is similar to the structure disclosed in FIG. 2, and the main difference therebetween, for example, lies in that the reflection structure 112' of the optical device 110' includes a multi-layer structure. The first light signal L1' emitted by the light sources 111' transmits through a first layer 112a and a second layer 112b, and is reflected by the finger 200 that contacts the second layer 112b as illustrated in FIG. 3. Sufficient teaching, suggestion, and description regarding the optical device depicted in FIG. 3 may be obtained from description in the embodiment of the optical device depicted in FIG. 2, and thus related description thereof is not repeated hereinafter.

Accordingly, the optical device 110 and 110' of the exemplary embodiments are a multi light path optical system, and both include a light path of reflection type and a light path of transmission type for fingerprint sensing. The light path of reflection type is a light path outside the finger 200, and the light path of transmission type is a light path propagating inside the finger 200. The processing circuit 120 identifies the fingerprint according to the first light signal L1 and the second light signal L2, so as to enhance the anti-spoofing capability of the optical apparatus 100. It should be noticed that the structures illustrated in FIG. 2 and FIG. 3 are exemplary examples, and the invention is not limited thereto.

Figure 4:
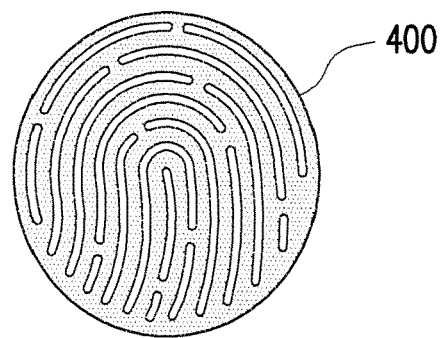
FIG. 4 and FIG. 5 respectively illustrate a first image and a second image of the fingerprint according to an embodiment of the invention.
Figure 5:
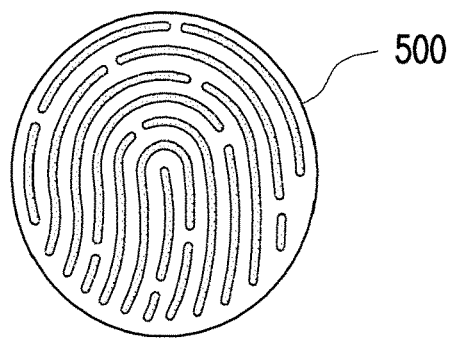

FIG. 4 and FIG. 5 respectively illustrate a first image and a second image of the fingerprint according to an embodiment of the invention. Referring to FIG. 1, FIG. 4 and FIG. 5, the optical device 110 of the present embodiment senses the first light signal L1 and the second light signal L2 via the reflection structure 112 and the transmission structure 114, respectively. The first image 400 and the second image 500 are respectively generated according to the first light signal L1 and the second light signal L2. The processing circuit 120 compares the first image 400 to at least one reference image to identify the fingerprint. The processing circuit 120 also compares the second image 500 to the at least one reference image to identify the fingerprint. The at least one reference image may be a registration record of a user's fingerprint which is pre-stored in the optical apparatus 100 in the present embodiment.

To be specific, the first image 400 is obtained via the reflection structure. The brightness of ridges of the fingerprint is dark, and the brightness of valleys of the fingerprint is bright as illustrated in FIG. 4. By contrast, the second image 500 is obtained via the transmission structure. The brightness of ridges of the fingerprint is bright, and the brightness of valleys of the fingerprint is dark as illustrated in FIG. 5. Accordingly, the first image 400 and the second image 500 include opposite tones in the present embodiment. The processing circuit 120 determines whether the first image 400 and the second image 500 have opposite tones according to the image brightness.

In the present embodiment, a two-dimensional fake fingerprint can be detected based on the first image 400 or the second image 500 since the brightness of ridges and valleys of a real fingerprint should be opposite. In the present embodiment, a three-dimensional fake fingerprint can also be detected by comparing the brightness of the first image 400 and/or the second image 500 to the registration record of the user's fingerprint. The difference between the brightness of the first image 400 and/or the second image 500 and the brightness of the real fingerprint should be small. In addition, by using the light sources 111 and 113 having multiple wavelengths, the three-dimensional fake fingerprint can also be detected. For example, absorption characteristics of the three-dimensional fake fingerprint for multiple wavelengths are different from that of the real fingerprint, and thus the three-dimensional fake fingerprint and the real fingerprint can be distinguished based on the absorption characteristics that appear in the brightness of the first image 400 or the second image 500.

Figure 6:
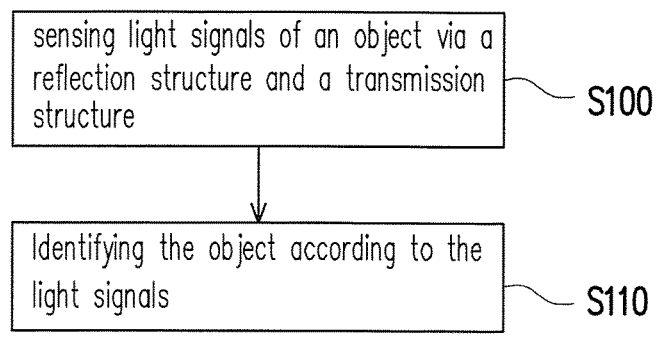
FIG. 6 is a flowchart illustrating steps in a method for identifying an object according to an embodiment of the invention.

FIG. 6 is a flowchart illustrating steps in a method for identifying an object according to an embodiment of the invention. Referring to FIG. 1 and FIG. 6, the method for identifying the object of the present embodiment is at least adapted to the optical apparatus 100 of FIG. 1, but the invention is not limited thereto. Taking the optical apparatus 100 of FIG. 1 for example, in step S100, the optical apparatus 100 senses the light signals of the object via the reflection structure 112 and the transmission structure 114 by the optical device 110. In step S110, the optical apparatus 100 identifies the object according to the light signals by the processing circuit 120. Besides, the method for identifying the object described in this embodiment of the invention is sufficiently taught, suggested, and embodied in the embodiments illustrated in FIG. 1 to FIG. 5, and therefore no further description is provided herein.

Figure 7:
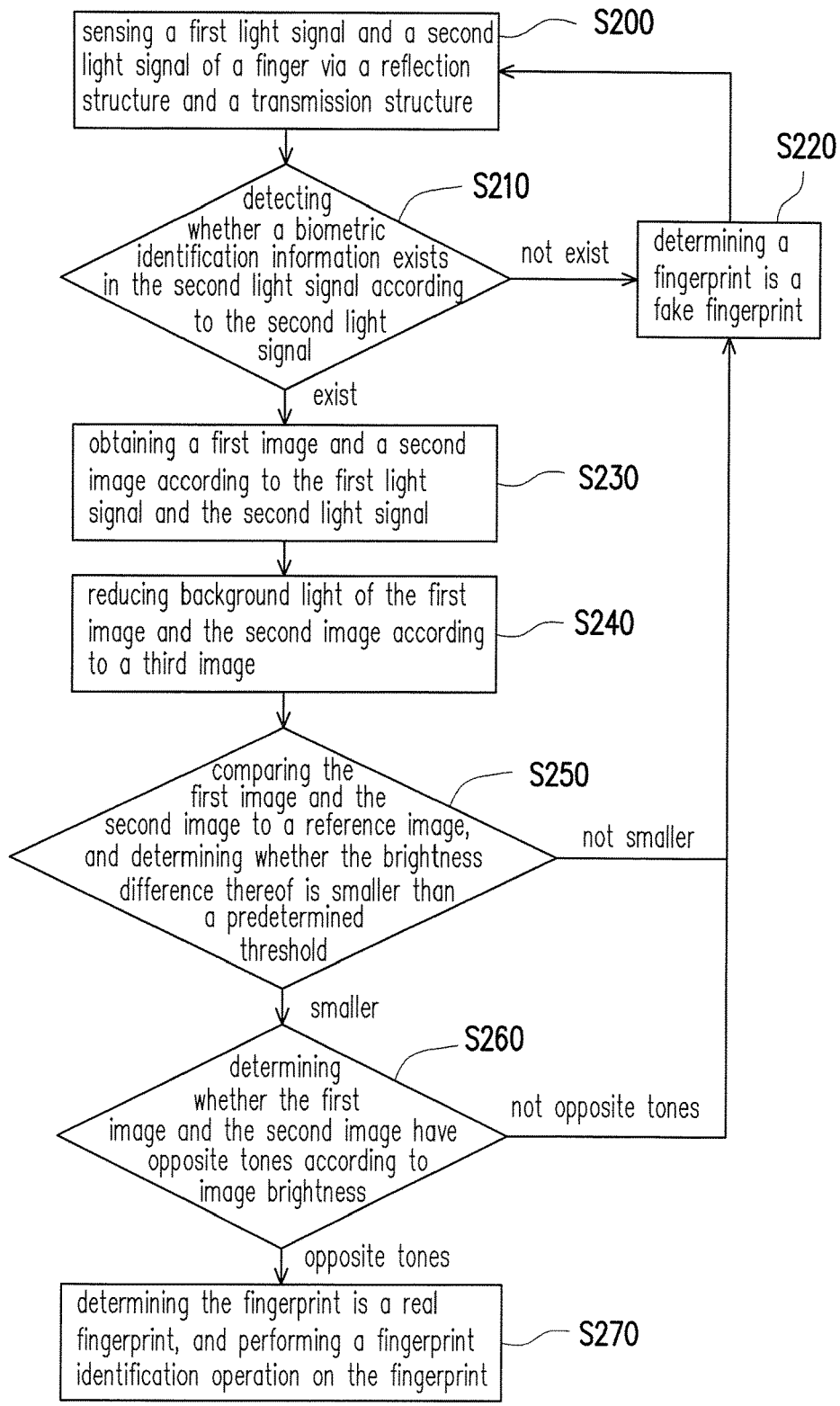
FIG. 7 is a flowchart illustrating steps in a method for detecting a fake fingerprint according to an embodiment of the invention.

FIG. 7 is a flowchart illustrating steps in a method for detecting a fake fingerprint according to an embodiment of the invention. Referring to FIG. 1 and FIG. 7, the method for detecting the fake fingerprint of the present embodiment is at least adapted to the optical apparatus 100 of FIG. 1, but the invention is not limited thereto. Taking the optical apparatus 100 of FIG. 1 for example, in step S200, the optical apparatus 100 senses the first light signal L1 and the second light signal L2 of the finger 200 via the reflection structure 112 and the transmission structure 114 by the optical device 110. In step S210, the optical apparatus 100 detects whether a biometric identification information, e.g. a heartbeat, exists in the second light signal L2 according to the second light signal L2. If the biometric identification information does not exist in the second light signal L2, the optical apparatus 100 determines the fingerprint is a fake fingerprint in step S220, and returns to step S200.

By contrast, if the biometric identification information exists in the second light signal L2, the optical apparatus 100 obtaining the first image 400 and the second image 500 according to the first light signal L1 and the second light signal L2 in step S230. In the present embodiment, the optical apparatus 100 further senses an environment light signal by the optical device 110, such that a third image is generated according to the environment light signal. Accordingly, the optical apparatus 100 reduces environment light of the first image 400 and the second image 500 according to the third image by the processing circuit 120 in step S240. In the present embodiment, the noise reduction operation in step S240 may be implemented by using any method for reducing noise in the related art, which are not particularly limited by the invention. Enough teaching, suggestion, and implementation illustration for aforesaid steps and embodiments thereof may be obtained with reference to common knowledge in the related art, which is not repeated hereinafter.

In step S250, the optical apparatus 100 compares the first image 400 and the second image 500 to a reference image, e.g. a registration record of a user's fingerprint, by the processing circuit 120, and determines whether the brightness difference thereof is smaller than a predetermined threshold. If the brightness difference of the first image 400 and the reference image and/or the brightness difference of the second image 400 and the reference image is not smaller than the predetermined threshold, the optical apparatus 100 returns to step S220 and determines the fingerprint is a fake fingerprint.

By contrast, if the brightness difference of the first image 400 and the reference image and/or the brightness difference of the second image 400 and the reference image is smaller than the predetermined threshold, the optical apparatus 100 goes to step S260, and determines whether the first image 400 and the second image 500 have opposite tones according to image brightness. If the first image 400 and the second image 500 do not have opposite tones, the optical apparatus 100 returns to step S220 and determines the fingerprint is a fake fingerprint.

In the present embodiment, if the first image 400 and the second image 500 have opposite tones, the optical apparatus 100 determines the fingerprint is a real fingerprint, and further performs a fingerprint identification operation on the fingerprint in step S270. In the present embodiment, the fingerprint identification operation in step S270 may be implemented by using any method for identifying a fingerprint in the related art, which are not particularly limited by the invention. Enough teaching, suggestion, and implementation illustration for aforesaid steps and embodiments thereof may be obtained with reference to common knowledge in the related art, which is not repeated hereinafter.

Figure 8:
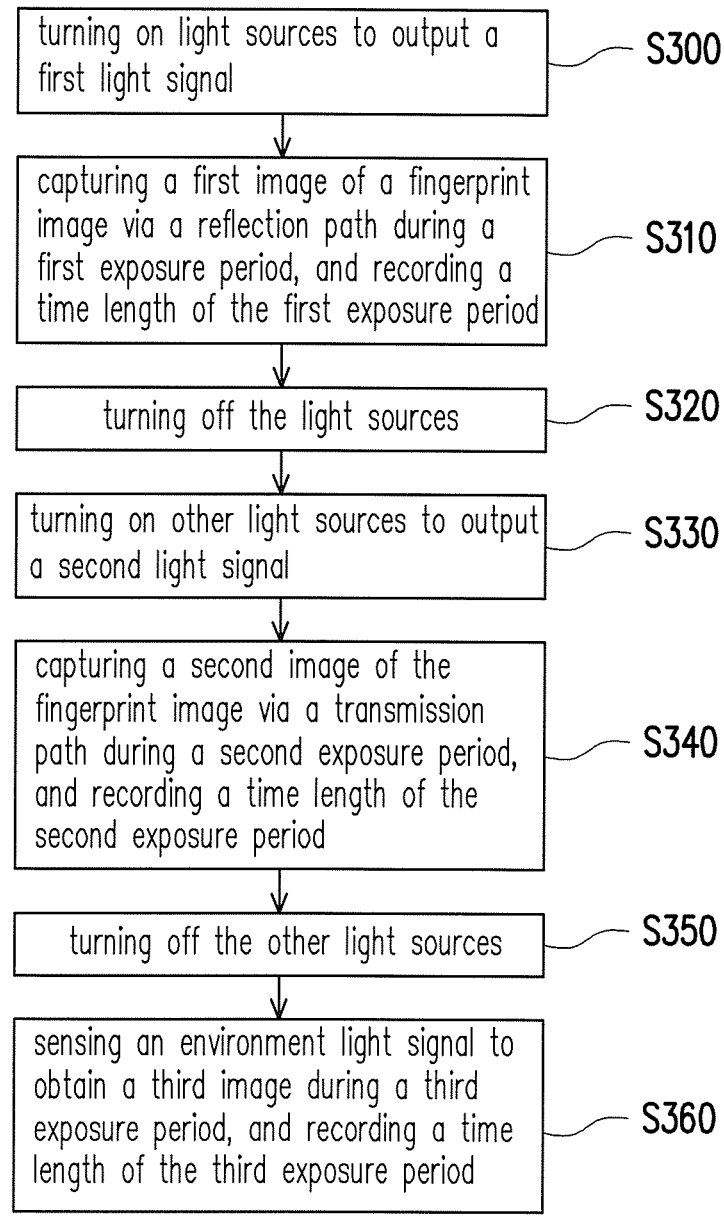
FIG. 8 is a flowchart illustrating steps in a method for capturing a fingerprint image according to an embodiment of the invention.

FIG. 8 is a flowchart illustrating steps in a method for capturing a fingerprint image according to an embodiment of the invention. Referring to FIG. 1 and FIG. 8, the method for capturing the fingerprint image of the present embodiment is at least adapted to the optical apparatus 100 of FIG. 1, but the invention is not limited thereto. Taking the optical apparatus 100 of FIG. 1 for example, the optical apparatus 100 captures the fingerprint image in a manner of time division in the present embodiment. That is to say, the optical device 110 senses the first light signal L1 and the second light signal L2 during different exposure periods. In step S300, the optical apparatus 100 turns on the light sources 111 to output the first light signal L1. The first light signal L1 is reflected by the reflection structure 112 and the finger 200, and transmits to the sensor 115. In step S310, the optical apparatus 100 captures a first image 400 of the fingerprint image via a reflection path during a first exposure period, and records a time length of the first exposure period. In step S320, the optical apparatus 100 turns off the light sources 111.

In step S330, the optical apparatus 100 turns on the light sources 113 to output the second light signal L2. The second light signal L2 transmits in the transmission structure 114, and propagates inside the finger 200, and transmits to the sensor 115. In step S340, the optical apparatus 100 captures a second image 500 of the fingerprint image via a transmission path during a second exposure period, and records a time length of the second exposure period. In step S350, the optical apparatus 100 turns off the light sources 113. In the present embodiment, the optical apparatus 100 also senses an environment light signal to obtain a third image during a third exposure period, and records a time length of the third exposure period in step S360.

Accordingly, the optical apparatus 100 captures the fingerprint image in the manner of time division in the present embodiment. It should be noticed that the sequence of steps S300 to S320, steps S330 to S350, and step S360 may be adjusted according to design requirements, and the invention is not limited thereto. In addition, the time lengths of the first exposure period, the second exposure period and the third exposure period may be the same or different, and the invention is not limited thereto.

Figure 9:
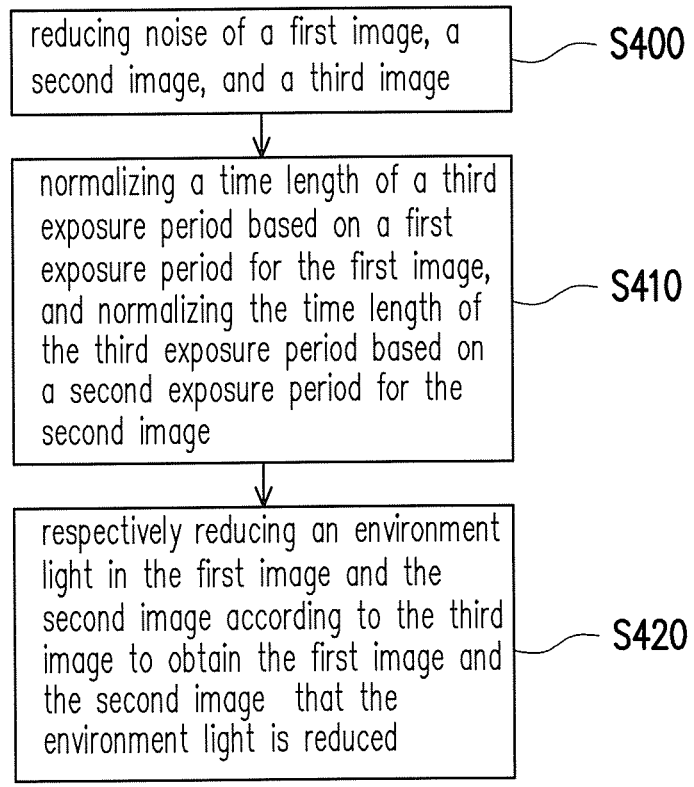
FIG. 9 is a flowchart illustrating steps in a method for environment light reduction according to an embodiment of the invention.

FIG. 9 is a flowchart illustrating steps in a method for environment light reduction according to an embodiment of the invention. Referring to FIG. 1 and FIG. 9, the method for environment light reduction of the present embodiment is at least adapted to the optical apparatus 100 of FIG. 1, but the invention is not limited thereto. Taking the optical apparatus 100 of FIG. 1 for example, the optical apparatus 100 reduces noise of the first image 400, the second image 500, and the third image in step S400. In step S410, the optical apparatus 100 normalizes the time length of the third exposure period based on the first exposure period for the first image 400, and also normalizes the time length of the third exposure period based on the second exposure period for the second image 500. In step S420, the optical apparatus 100 respectively reduces the environment light in the first image 400 and the second image 500 according to the third image to obtain the first image 400 and the second image 500 that the environment light is reduced.

In the present embodiment, the operations in steps S400, S410 and S420 may be implemented by using any adapted operation method in the related art, which are not particularly limited by the invention. Enough teaching, suggestion, and implementation illustration for aforesaid steps and embodiments thereof may be obtained with reference to common knowledge in the related art, which is not repeated hereinafter.

Figure 10:
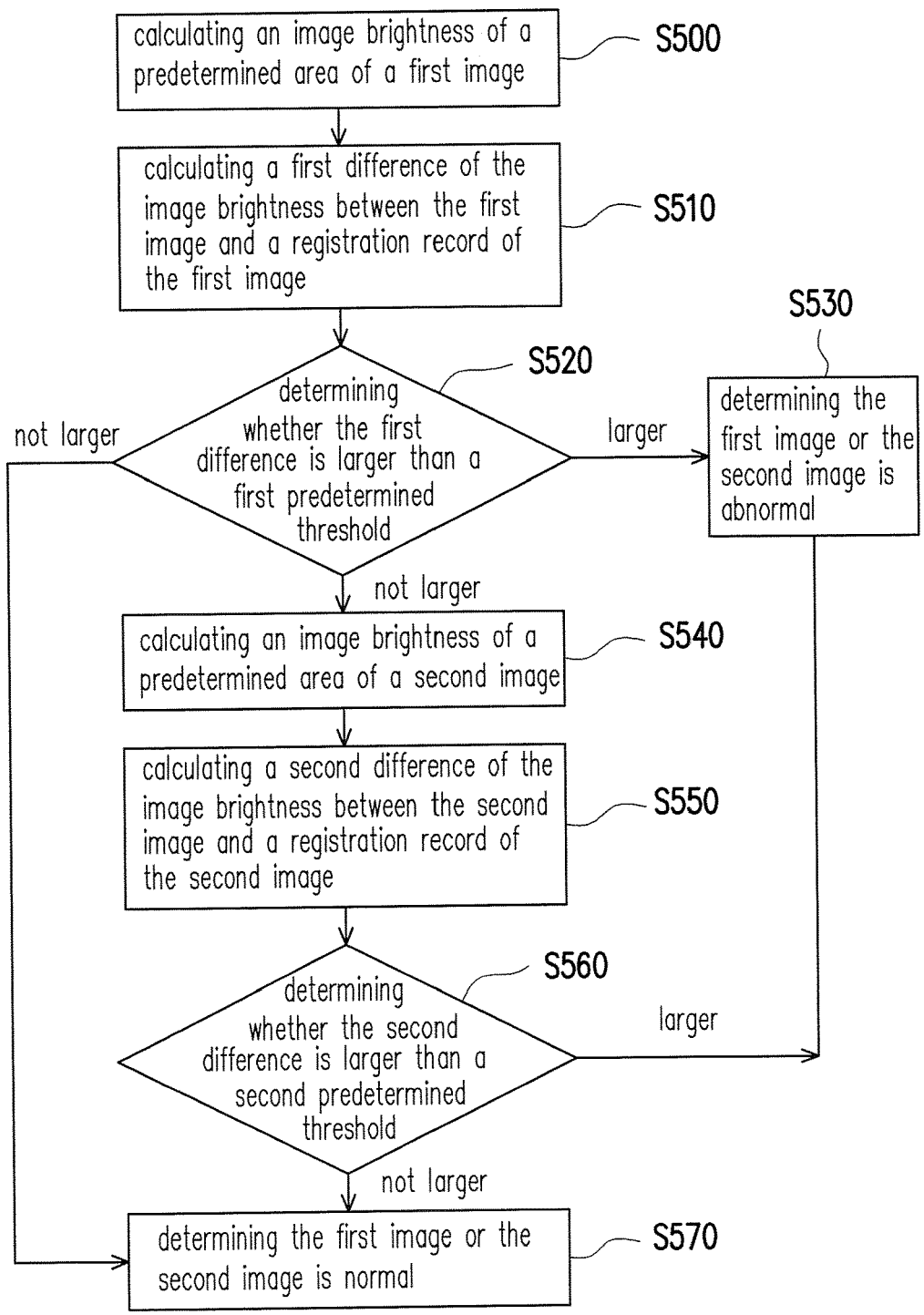
FIG. 10 is a flowchart illustrating steps in a method for checking image brightness according to an embodiment of the invention.

FIG. 10 is a flowchart illustrating steps in a method for checking image brightness according to an embodiment of the invention. Referring to FIG. 1 and FIG. 10, the method for checking image brightness of the present embodiment is at least adapted to the optical apparatus 100 of FIG. 1, but the invention is not limited thereto. Taking the optical apparatus 100 of FIG. 1 for example, the optical apparatus 100 calculates an image brightness of a predetermined area of the first image 400 in step S500. The optical apparatus 100 further calculates the first difference of the image brightness between the first image 400 and the registration record of the first image 400 in step S510. In step S520, the optical apparatus 100 determines whether the first difference is larger than a first predetermined threshold. If the first difference is larger than the first predetermined threshold, the optical apparatus 100 determines the first image 400 is abnormal in step S530.

By contrast, if the first difference is not larger than the first predetermined threshold, the optical apparatus 100 determines the first image 400 is normal in step S570, and the optical apparatus 100 calculates an image brightness of a predetermined area of the second image 500 in step S540. The optical apparatus 100 further calculates the second difference of the image brightness between the second image 500 and the registration record of the second image 500 in step S550. In step S560, the optical apparatus 100 determines whether the second difference is larger than a second predetermined threshold. If the second difference is larger than the second predetermined threshold, the optical apparatus 100 returns to step S530 and determines the second image 500 is abnormal in step S530. If the second difference is not larger than the second predetermined threshold, the optical apparatus 100 determines the second image 500 is normal in step S570.

It should be noticed that the sequence of steps S500 to S520 and steps S540 to S560 may be adjusted according to design requirements, and the invention is not limited thereto. In addition, the first predetermined threshold and the second predetermined threshold may be the same or different, and the invention is not limited thereto. In the present embodiment, the operations in steps S500 to S570 may be implemented by using any adapted operation method in the related art, which are not particularly limited by the invention. Enough teaching, suggestion, and implementation illustration for aforesaid steps and embodiments thereof may be obtained with reference to common knowledge in the related art, which is not repeated hereinafter.

Figure 11:
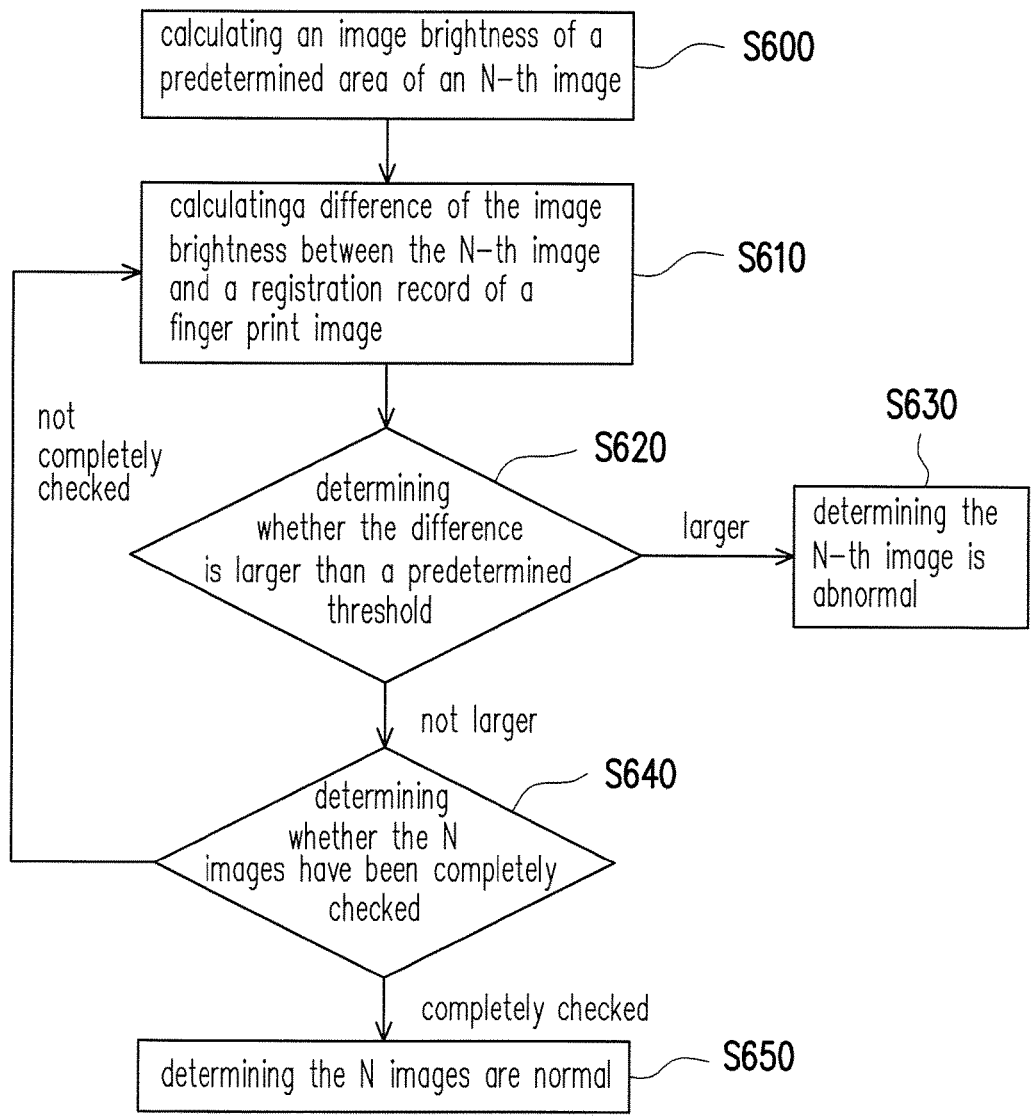
FIG. 11 is a flowchart illustrating steps in a method for checking image brightness according to another embodiment of the invention.

FIG. 11 is a flowchart illustrating steps in a method for checking image brightness according to another embodiment of the invention. Referring to FIG. 1 and FIG. 11, the method for checking image brightness of the present embodiment is at least adapted to the optical apparatus 100 of FIG. 1, but the invention is not limited thereto. Taking the optical apparatus 100 of FIG. 1 for example, N images of the fingerprint corresponding to N types of light sources or light transmission paths are obtained in the present embodiment, where N is an integer larger than or equal to 3. The optical apparatus 100 calculates an image brightness of a predetermined area of the N-th image in step S600. The optical apparatus 100 further calculates the difference of the image brightness between the N-th image and the registration record of the fingerprint image in step S610. In step S620, the optical apparatus 100 determines whether the difference is larger than a predetermined threshold. If the difference is larger than the predetermined threshold, the optical apparatus 100 determines the N-th image is abnormal in step S630.

By contrast, if the difference is not larger than the predetermined threshold, the optical apparatus 100 determines whether the N images have been completely checked in step S640. If the N images have been completely checked, the optical apparatus 100 determines the N images are normal in step S650. If the N images are not completely checked, the optical apparatus 100 returns to step S610, and calculates an image brightness of a predetermined area of the (N+1)-th image. Besides, the method for checking image brightness described in this embodiment of the invention is sufficiently taught, suggested, and embodied in the embodiments illustrated in FIG. 10, and therefore no further description is provided herein.

Figure 12:
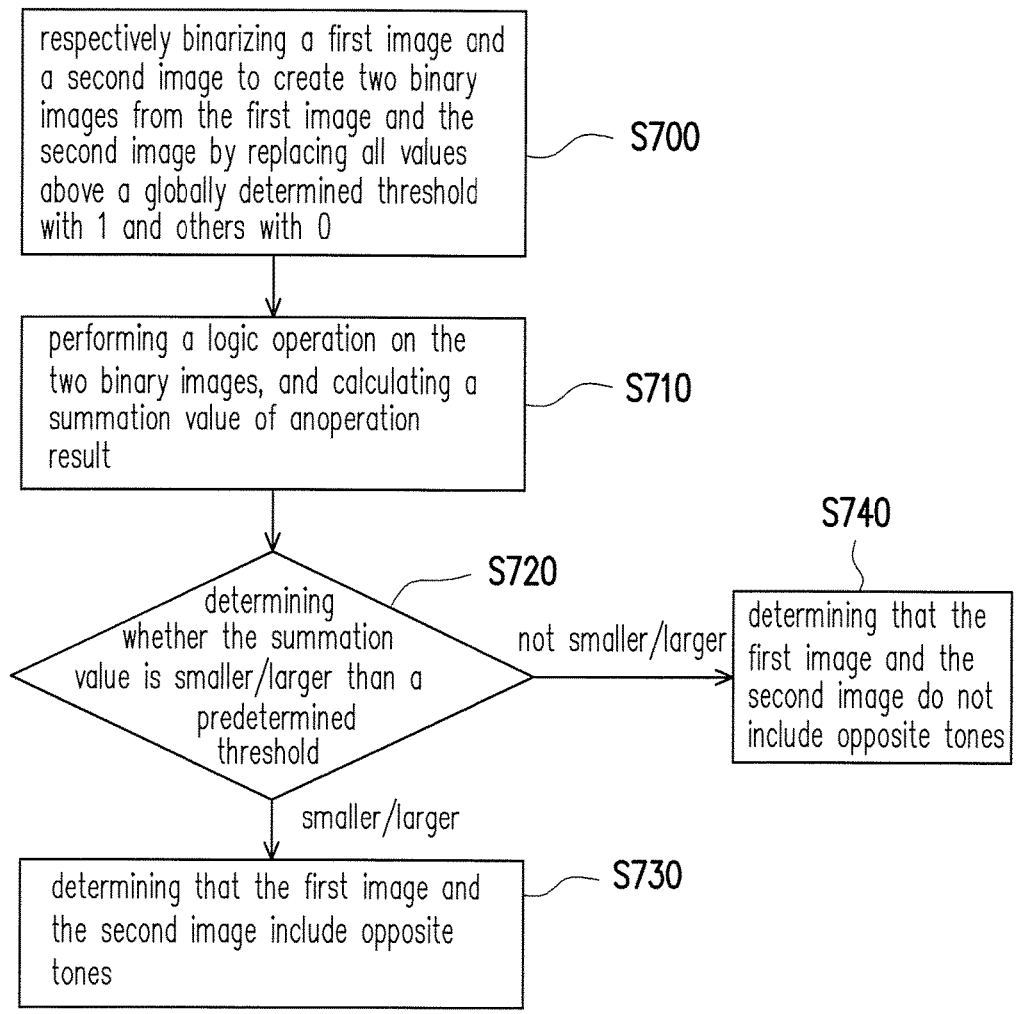
FIG. 12 is a flowchart illustrating steps in a method for comparing image tone according to an embodiment of the invention.

FIG. 12 is a flowchart illustrating steps in a method for comparing image tone according to an embodiment of the invention. Referring to FIG. 1 and FIG. 12, the method for comparing image tone of the present embodiment is at least adapted to the optical apparatus 100 of FIG. 1, but the invention is not limited thereto. Taking the optical apparatus 100 of FIG. 1 for example, the optical apparatus 100 respectively binarizes the first image 400 and the second image 500 to create two binary images from the first image 400 and the second image 500 by replacing all values above a globally determined threshold with 1 and others with 0 in step S700. The optical apparatus 100 performs a logic operation on the two binary images, and then calculates a summation value of the operation result in step S710. In the present embodiment, the logic operation may be selected from one of an AND operation and an exclusive-OR operation, but the invention is not limited thereto.

For the AND operation, the optical apparatus 100 determines whether the summation value is smaller than a predetermined threshold in step S720. If the summation value is smaller than the predetermined threshold, the optical apparatus 100 determines that the first image 400 and the second image 500 include opposite tones in step S730. If the summation value is not smaller than the predetermined threshold, the optical apparatus 100 determines that the first image 400 and the second image 500 do not include opposite tones in step S740.

For the exclusive-OR operation, the optical apparatus 100 determines whether the summation value is larger than a predetermined threshold in step S720. If the summation value is larger than the predetermined threshold, the optical apparatus 100 determines that the first image 400 and the second image 500 include opposite tones in step S730. If the summation value is not larger than the predetermined threshold, the optical apparatus 100 determines that the first image 400 and the second image 500 do not include opposite tones in step S740.

In summary, in the exemplary embodiments of the invention, the light signals sensed by the optical device transmit in multi-light paths for fingerprint application. The optical device includes the reflection structure and the transmission structure for reflecting one of the light signals, and transmitting another of the light signals, such that the first image and the second image respectively generated according to the light signals have opposite tones. The processing circuit identifies the fingerprint according to the first image and the second image having opposite tones, and thereby enhances the anti-spoofing capability and providing a satisfactory identification quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical apparatus, adapted to contact an object, the optical apparatus comprising:

an optical device, comprising a reflection structure and a transmission structure, wherein the optical device senses light signals of the object via the reflection structure and the transmission structure, the light signals comprise a first light signal and a second light signal, the first light signal transmits in the reflection structure and is reflected by the object, and the second light signal transmits in the transmission structure and propagates inside the object; and a processing circuit, electrically connected to the optical device, and configured to identify a fingerprint of the object according to the light signals.

2. The optical apparatus according to claim 1, wherein the optical device further comprises an isolation structure, configured to isolate the first light signal from the second light signal.

3. The optical apparatus according to claim 1, wherein a wavelength of the first light signal is different from a wavelength of the second light signal.

4. The optical apparatus according to claim 1, wherein the optical device senses the first light signal and the second light signal during different exposure periods.

5. The optical apparatus according to claim 1, wherein the second light signal comprises a fingerprint identification information, and the processing circuit identifies the fingerprint of the object according to the fingerprint identification information.

6. The optical apparatus according to claim 1, wherein a first image and a second image are respectively generated according to the first light signal and the second light signal.

7. The optical apparatus according to claim 6, wherein the optical device further senses an environment light signal, a third image is generated according to the environment light signal, and the processing circuit reduces an environment light of the first image and the second image according to the third image.

8. The optical apparatus according to claim 6, wherein the processing circuit respectively compares the first image and the second image to at least one reference image to identify the object.

9. The optical apparatus according to claim 1, wherein the processing circuit determines whether the first image and the second image have opposite tones according to image brightness.

10. A method for identifying an object, adapted to an optical apparatus, and comprising:

sensing light signals of the object via a reflection structure and a transmission structure, wherein the optical apparatus comprises the reflection structure and the transmission structure, the light signals comprise a first light signal and a second light signal, the first light signal transmits in the reflection structure and is reflected by the object, and the second light signal transmits in the transmission structure and propagates inside the object; and identifying a fingerprint of the object according to the light signals.

11. The method for identifying the object according to claim 10, wherein in the step of sensing light signals of the object via the reflection structure and the transmission structure, the first light signal and the second light signal are sensed during different exposure periods.

12. The method for identifying the object according to claim 10, wherein the second light signal comprises a fingerprint identification information, and the step of identifying the fingerprint of the object according to the light signals comprises:

identifying the fingerprint of the object according to the fingerprint identification information.

13. The method for identifying the object according to claim 10, further comprising:

respectively generating a first image and a second image according to the first light signal and the second light signal.

14. The method for identifying the object according to claim 13, further comprising:

sensing an environment light signal, and generating a third image according to the environment light signal; and reducing an environment light of the first image and the second image according to the third image.

15. The method for identifying the object according to claim 13, further comprising:

respectively comparing the first image and the second image to at least one reference image to identify the object.

16. The method for identifying the object according to claim 10, further comprising:

determining whether the first image and the second image have opposite tones according to image brightness.

17. The method for identifying the object according to claim 10, wherein the optical apparatus further comprises an isolation structure, configured to isolate the first light signal from the second light signal.

18. The method for identifying the object according to claim 10, wherein a wavelength of the first light signal is different from a wavelength of the second light signal.

* * * * *